United States Patent [19]

Johnson et al.

[11] 4,358,337

[45] Nov. 9, 1982

[54] TAPE APPLICATOR

[75] Inventors: Eugene R. Johnson, Burlingame; Jack P. Haran, Mt. View, both of Calif.

[73] Assignee: Bliss & Laughlin Industries, Inc., Oak Brook, Ill.

[21] Appl. No.: 324,038

[22] Filed: Nov. 23, 1981

[51] Int. Cl.[3] .......................... B32B 31/00; B44C 7/00

[52] U.S. Cl. .................................... 156/526; 156/524; 156/575; 156/577; 156/579

[58] Field of Search ............... 156/523, 524, 525, 526, 156/527, 574, 575, 577, 579

[56] References Cited

U.S. PATENT DOCUMENTS

| | | | |
|---|---|---|---|
| 2,288,987 | 7/1942 | Allen | 156/575 |
| 3,260,638 | 7/1966 | Hoveland | 156/526 |
| 3,880,701 | 4/1975 | Moree | 156/575 |
| 4,086,121 | 4/1978 | Ames | 156/575 |
| 4,090,914 | 5/1978 | Hauk et al. | 156/575 |
| 4,105,490 | 8/1978 | Lass | 156/575 |

*Primary Examiner*—Michael G. Wityshyn

*Attorney, Agent, or Firm*—Ernest M. Anderson

[57] ABSTRACT

A tape applicator and mastic dispenser for dry wall taping comprising a holder for a replaceable cartridge, means for forcing mastic material from said cartridge through a discharge outlet onto a tape, tape advancing means for feeding a tape from a supply roll beneath the discharge outlet, a roll for applying a mastic coated segment of tape onto a wall joint and means connecting the roll to the tape advancing means for positioning the roll in retracted or tape supporting position by actuation of the tape advancing means, whereby the pressure roll is retracted as tape is advanced beneath the discharge outlet and selectively positionable in front of the dispenser for supporting and applying mastic coated tape to a wall joint.

12 Claims, 10 Drawing Figures

TAPE APPLICATOR

SUMMARY OF THE INVENTION

This invention relates generally to a tape applicator and mastic dispenser. Devices of this kind are generally known and are utilized quite extensively by professional dry wall tapers in the construction industry. The present invention incorporates several new features allowing an applicator to be constructed less expensively than devices of the prior art and to be used by non-professional and relatively inexperienced persons. The invention is believed to be particularly suitable for do-it-yourselfers and those who have only a sporadic need for a tape applicator.

In brief, the present invention provides a tape applicator and mastic dispenser that includes a tape advancing mechanism for feeding tape from a supply roll beneath the discharge outlet of a mastic dispenser. A pressure roll is provided for applying a mastic coated segment of tape to a wall joint and means is provided for retracting the pressure roll as tape is being advanced, thus allowing the lead end of a tape to be carried over the pressure roll as tape is advanced beneath the discharge outlet.

The invention further provides tape advancing means comprising a tape guide, a spring biased contact engageable with tape that is supported within the tape guide and manual actuating means for reciprocally moving said contact along the tape guide and advancing tape from a supply roll.

A novel cutter means is provided for serving the tape intermediate the discharge outlet of the dispenser and the tape advancing mechanism.

The invention further contemplates a tape applicator including a holder for refillable cartridge. Thus the applicator obviates the need of a large supply chamber, pressure tanks and related apparatus normally used with commercial apparatus.

It will be evident, therefore, that a primary object of the present invention is to provide a novel tape applicator and dispenser that is particularly suited for home use, i.e., an applicator that is easily used by inexperienced and relatively unskilled persons.

A further object of the invention is to provide a hand held unit that includes a replaceable or refillable cartridge.

A still further object is to provide a tape applicator of the kind described including a novel cutter arrangement and feed mechanism for advancing tape from a supply roll beneath a discharge outlet and over a pressure roll that serves to crease the tape and force the tape onto a dry wall joint or into a corner.

Further objects of this invention will become apparent in view of the following detailed description.

BRIEF DESCRIPTION OF THE DRAWINGS

In the drawings forming a part of this application in which like parts are identified by like reference numerals throughout the same.

DESCRIPTION OF THE PREFERRED EMBODIMENT

Figures 1, 2:
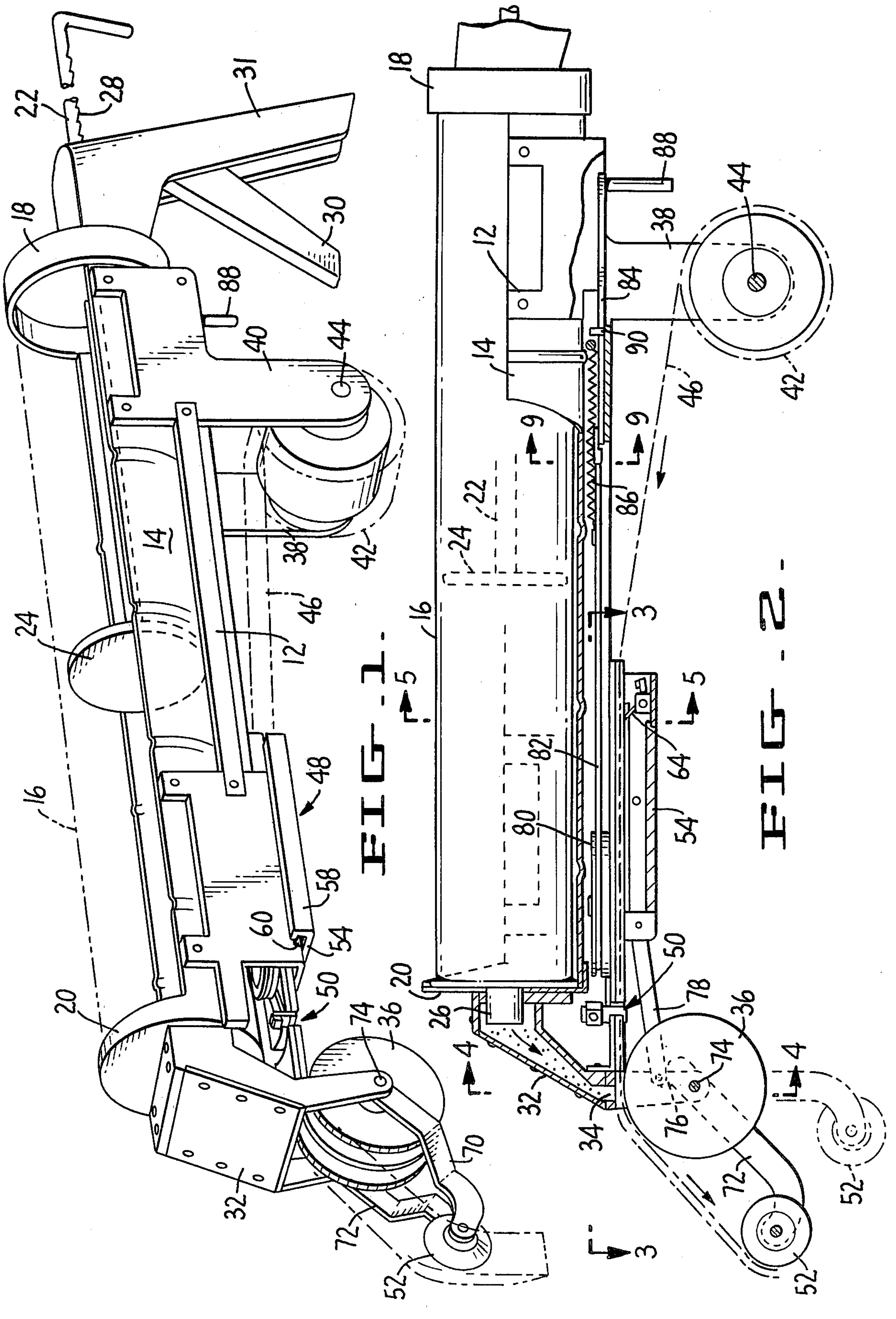
FIG. 1 is a perspective view of the invention in a tape applicator and dispenser.
FIG. 2 is a vertical section through the applicator.
Figure 3:
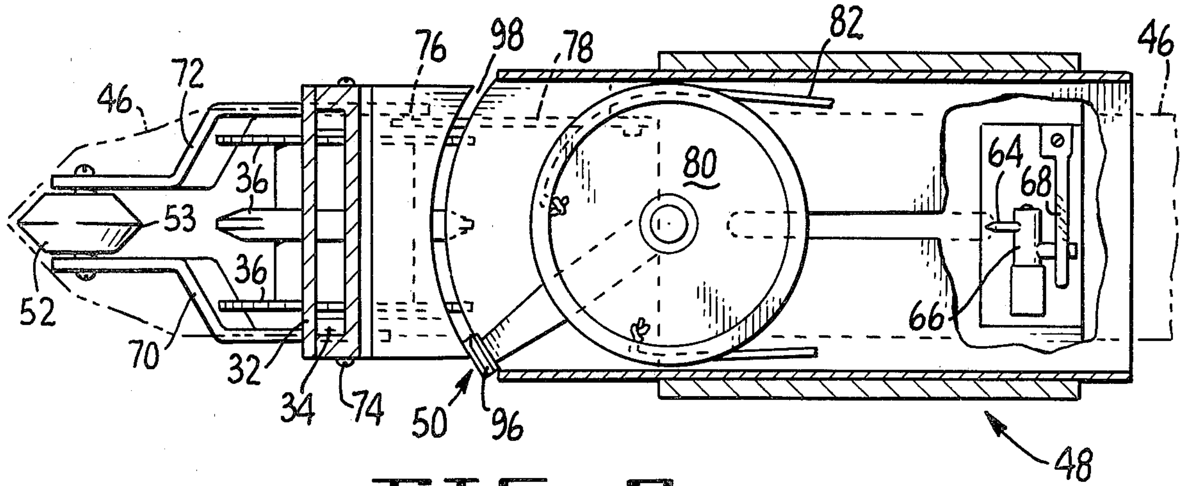
FIG. 3 is a partial horizontal section taken on line 3—3 of FIG. 2.

Referring now to the drawings by reference characters, the device of the present invention includes a frame 12 which carries a semi-cylindrical cradle 14 for supporting a tube of mastic 16. At one end of the cradle 14 a cup-like member 18 serves to retain the back end of tube 16 while at the opposite end is a second cup-like member 20 which retains the dispensing end of tube 16. A piston rod 22 holds piston 24 which is used to push the mastic out of the tube 16 through nozzle 26 in the tube. Piston rod 22 has ratchet teeth 28 thereon and a trigger 30 pivoted to handle 31 serves to advance the piston rod 22 and thus dispense mastic as the trigger is actuated. This mechanism is well-known to those skilled in the art and therefore not described in detail. Mastic discharged through the nozzle 26 is directed by chute 32 out through a discharge opening 34 located just above roller 36, later to be described in detail. Handle 31 enables an operator to hold and use the device with one hand.

Near the rear of frame 12 are two downwardly directed arms 38 and 40 which support a roll of tape 42 on pin 44. The tape 46 from roll 42 passes through a tape advancing mechanism generally designated 48, past a cutter mechanism generally designated 50, over the support roller 36 and thence to the pressure applying roller 52.

Figure 5:
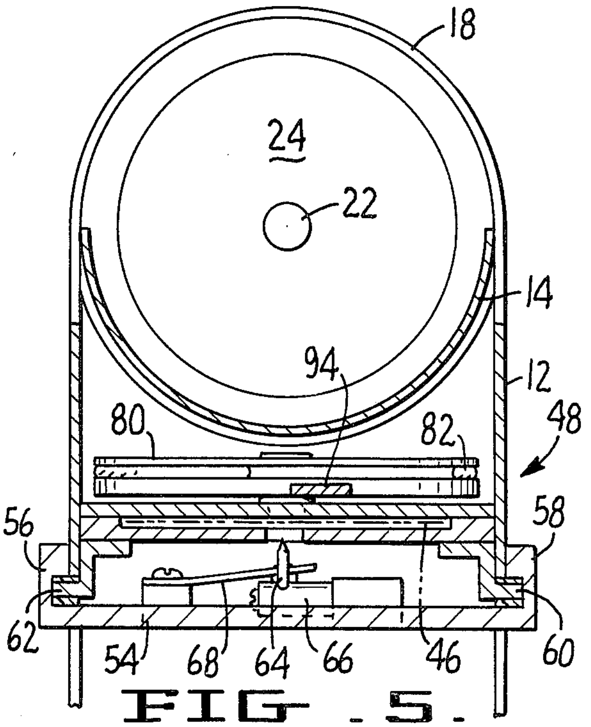
FIG. 5 is an enlarged vertical section taken on line 5—5 of FIG. 2.
Figure 6:
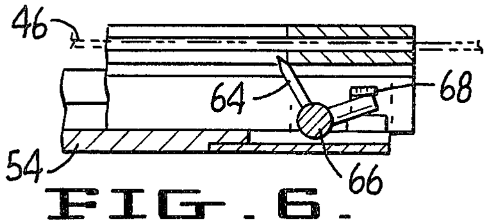
FIGS. 6 and 7 are vertical sections of a portion of the tape advance mechanism.
Figure 7:
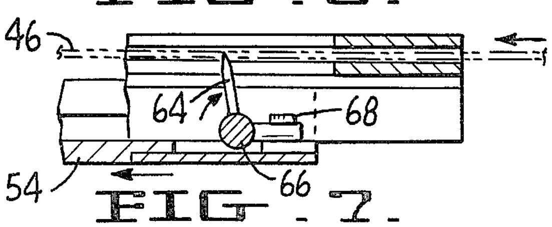

The tape advancing mechanism includes a slide 54 which has inturned lips 56 and 58 which engage the rails 60 and 62 mounted on the frame of the machine. As can best be seen in FIGS. 5, 6 and 7, the slide 54 carries a pin 64 mounted on a pivoted arm 66. A leaf spring 68 normally biases the pin upwardly to the position shown in FIG. 7. Thus, the pin normally engages the tape 46 so that if one moves the slide forward, as is shown in FIG. 7, the upright pin engages the tape 46 and moves it as the slide 54 is pushed forward. As the slide is retracted, as is shown in FIG. 6, spring 68 allows pin 64 to tilt, thus allowing one to retract the slide without moving or tearing the tape.

Figure 4:
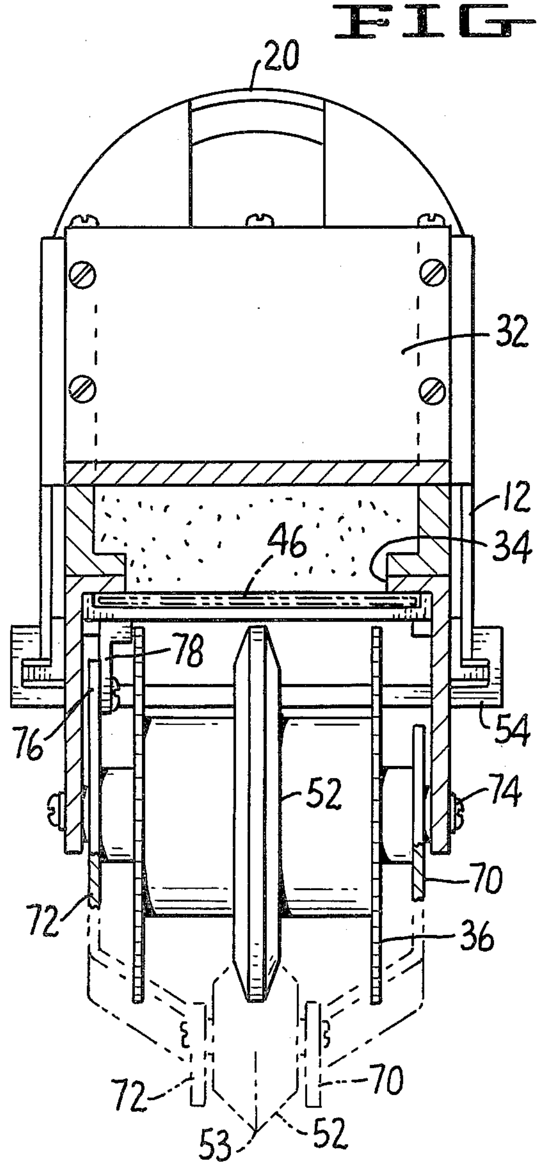
FIG. 4 is a front elevation and partial section taken on line 4—4 of FIG. 2.
Figures 8, 9, 10:
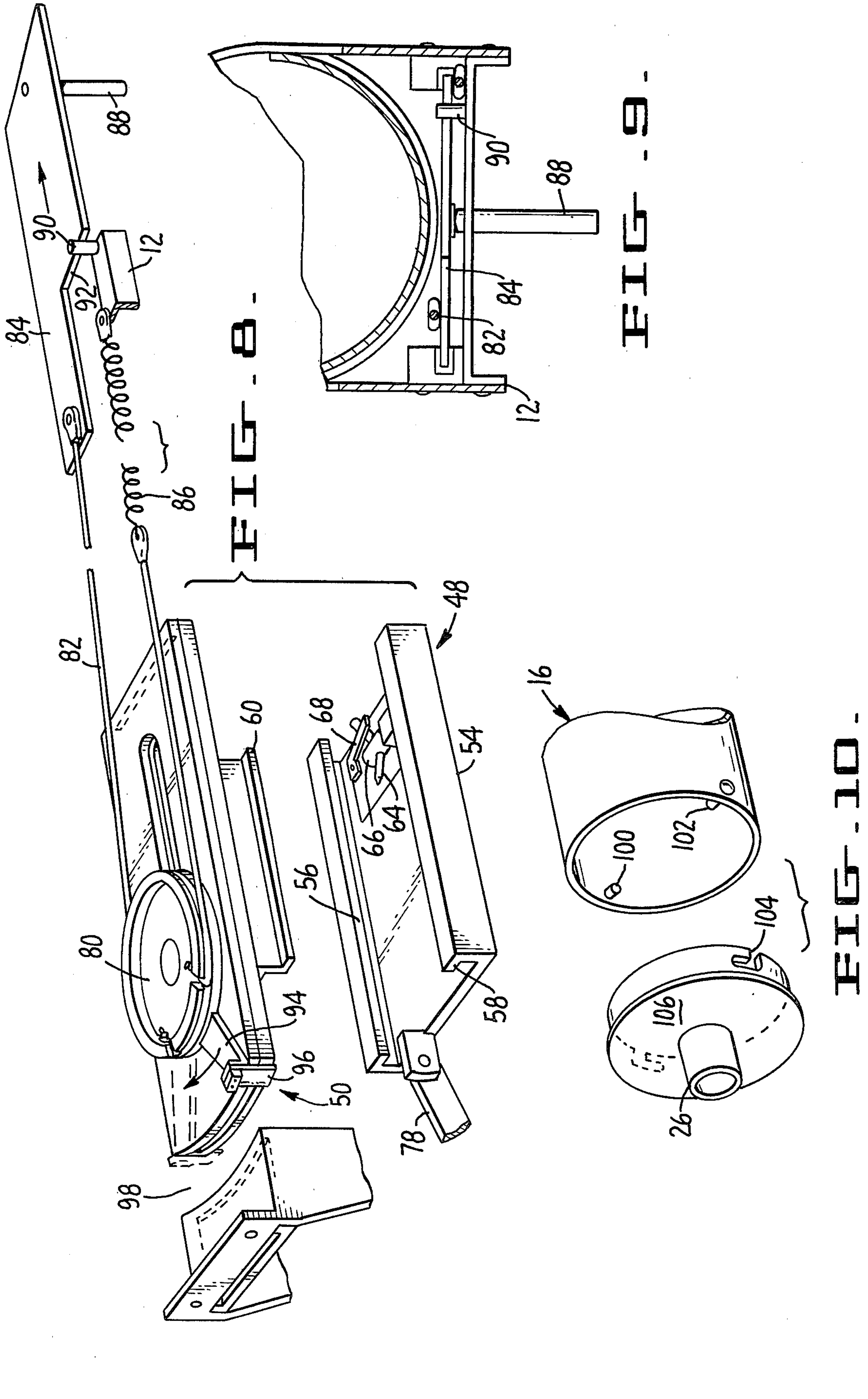
FIG. 8 is a perspective view of a portion of the cutter mechanism, tape guide and tape advance means.
FIG. 9 is a vertical section taken on line 9—9 of FIG. 2.
FIG. 10 is a perspective view of one end of a refillable cartridge that may be used with the tape applicator and dispenser.

Slide 54 has a second function, namely, to advance or retract pressure roller 52. Pressure roller 52 is mounted on arms 70 and 72 which are pivoted on pin 74 which also serves as an axis for the roller 36. Arm 70 terminates at pin 74 while arm 72 has an extension thereon designated 76. An arm 78 is pivoted on one end to the slide 54, as is shown in FIG. 8, while the opposite end of arm 78 is pivoted on the extension 76 of arm 72. Thus, while tape is being dispensed, i.e., the slide 54 is being moved forward, the arms carrying roller 52 are retracted to the position shown in phantom in FIGS. 2 and 4. Now, at the completion of a stroke, i.e. as the slide 54 is moved to the rear, the pressure roller 52 is advanced to the position shown in solid lines in FIGS. 2 and 4 so that one can now apply the tape to a wall. Of course, the operator will apply mastic, as required by the actuation of trigger 30. Preferably the periphery of roller 52 has a V-shape 53 as best seen in FIG. 4. This aids in creasing the tape and pressing it into a corner.

The device of the present invention also includes a tape cutoff mechanism. This is mounted on the frame of the machine above slide 54. It includes a pulley 80 mounted for rotation on the frame 12 with a flexible cable 82 passing around the periphery of the pulley. One end of the cable is attached to a slide 84 while the opposite end is attached to a spring 86. The slide 84 includes a pin 88 which can be actuated as a trigger. A stop 90 acts against abutment 92 on slide 84 so that normally the slide 84 is held in the forward position as is shown in FIG. 8. Pulley 80 carries an arm 94 to which is attached a cutter blade 96 which can move through the radial slot 98. After a sufficient length of tape has been dispensed, one merely pulls on pin 88 which swings arm 94 and the cutter blade 96 in the direction shown by the arrow in FIG. 8, cutting off a desired length of tape.

Tube 16 which carries the mastic may be made refillable. Thus, the forward end of tube 16 has the inwardly directed pins 100 and 102 which mate with slots 104 in the removable cap 106 as seen in FIG. 10.

Although a specific embodiment of the invention has been shown, it will be obvious to those skilled in the art that many variations can be made without departing from the spirit of this invention.

What is claimed is:

1. A tape applicator and mastic dispenser comprising:
- means for dispensing mastic material from a container through a discharge outlet;
- means for supporting a roll of tape on said dispensing means;
- tape advancing means including means for periodically activating same and feeding tape from a thus supported roll of tape beneath said discharge outlet;
- a pressure roll for applying a mastic coated segment of tape to a wall joint; and
- means connecting said pressure roll to said tape advancing means for positioning said roll in retracted or tape supporting positions by actuation of said tape advancing means, whereby said pressure roll is retracted as tape is advanced beneath said discharge outlet and positioned in front of said dispensing means for supporting and applying mastic coated tape to a wall joint when said tape advancing means is not activated.

2. The tape applicator of claim 1, said pressure roll having a V-shaped contact surface for creasing the tape and forcing said tape into a corner.

3. The tape applicator of claim 1, said tape advancing means comprising a slide mechanism, a tape guide, a spring biased contact engageable with a tape within said tape guide, manual actuating means for reciprocally moving said contact along said tape guide and advancing tape from a roll, said contact being retracted against the spring bias by the tape as said actuating means is manually retracted.

4. The tape applicator of claim 1, and further comprising a tape support fixedly mounted to said dispenser directly in front of the discharge outlet.

5. The tape applicator of claim 1, and further comprising cutter means for severing the tape intermediate said discharge outlet and said tape advancing means.

6. The tape applicator of claim 1, said means for dispensing mastic material comprising a holder for a replaceable cartridge, and means for forcing mastic material from said cartridge through said discharge outlet.

7. The tape applicator of claim 6, said means for mounting a roll of tape being located on the underside of said holder.

8. The tape applicator of claim 6, and further comprising a tape guide and cutter means for severing the tape, said cutter means being located intermediate said discharge outlet and said tape advancing means and mounted on the underside of said holder.

9. The tape applicator of claim 6, said pressure roll being rotatably mounted upon a bracket pivotally connected to said holder, pivotal actuation of said bracket positioning said roll in retracted or tape supporting positions.

10. The tape applicator of claim 6, said means for dispensing mastic material including a handle grip mounted on the rear end of said holder and a finger engageable trigger for actuating said means for forcing mastic material from said cartridge, said trigger being located relative to said handle grip for operation and holding with one hand.

11. The tape applicator of claim 10, and further comprising a tape guide, cutter means for severing tape fed through said guide and intermediate said discharge outlet and tape advancing means, and cutter actuating means including a finger engageable member located in near proximity to said handle grip and trigger for one hand operation.

12. The tape applicator of claim 11, said cutter means comprising a wheel pivotally mounted on an axis perpendicular to the direction of tape fed through said tape guide, a cutter support arm mounted to and radially extending from said wheel, a cutter blade mounted to and depending from said arm, and means for pivoting said wheel upon said axis to move said cutter blade across the path of tape advanced through said tape guide.

* * * * *